United States Patent [19]
Barenyi

[11] 3,789,944
[45] Feb. 5, 1974

[54] MOTOR VEHICLE FRONT END CONSTRUCTION

[75] Inventor: Bela Barenyi, Maichingen, Germany

[73] Assignee: Daimler-Benz Aktiengesellschaft, Stuttgart-Unterturkheim, Germany

[22] Filed: Sept. 2, 1971

[21] Appl. No.: 177,365

[30] Foreign Application Priority Data
Sept. 2, 1970  Germany.............................. 2043524

[52] U.S. Cl. ............. 180/68 P, 180/82, 280/106 R, 293/DIG. 3, 296/28 J
[51] Int. Cl............................................. B60r 19/06
[58] Field of Search.... 180/91, 82, 68, 64; 280/106; 296/28 R, 28 F, 28 J; 293/DIG. 3, DIG. 5, 1, 293/70; 188/1 C

[56] References Cited
UNITED STATES PATENTS

| 1,175,348 | 3/1916 | Fageol | 293/70 |
| 2,610,881 | 9/1952 | Schuettpelz | 293/70 |
| 3,171,669 | 3/1965 | Barenyi | 180/91 X |
| 3,307,868 | 3/1967 | Blank | 188/1 C X |
| 3,520,550 | 7/1970 | Dysarz et al. | 280/106 R |
| 1,361,066 | 12/1920 | Johnson | 180/68 R |
| 2,260,578 | 10/1941 | Murray | 180/68 R X |

FOREIGN PATENTS OR APPLICATIONS

| 18,213 | 9/1911 | Great Britain | 293/DIG. 3 |

Primary Examiner—David Schonberg
Assistant Examiner—Milton L. Smith
Attorney, Agent, or Firm—Craig and Antonelli

[57] ABSTRACT

A front end arrangement with a radiator for motor vehicles, especially for passenger motor vehicles, in which longitudinal support girders that adjoin the form-rigid passenger center cell of the vehicle, are forked within the area of the axle planes while the radiator is arranged at mountings adjacent to and/or above the impact yielding areas of angular bends in the longitudinal girders so that the longitudinal girders possess a longitudinal yieldingness and the radiator and engine units are damaged only after the normal range of penetration of the bumper is overcome.

35 Claims, 4 Drawing Figures

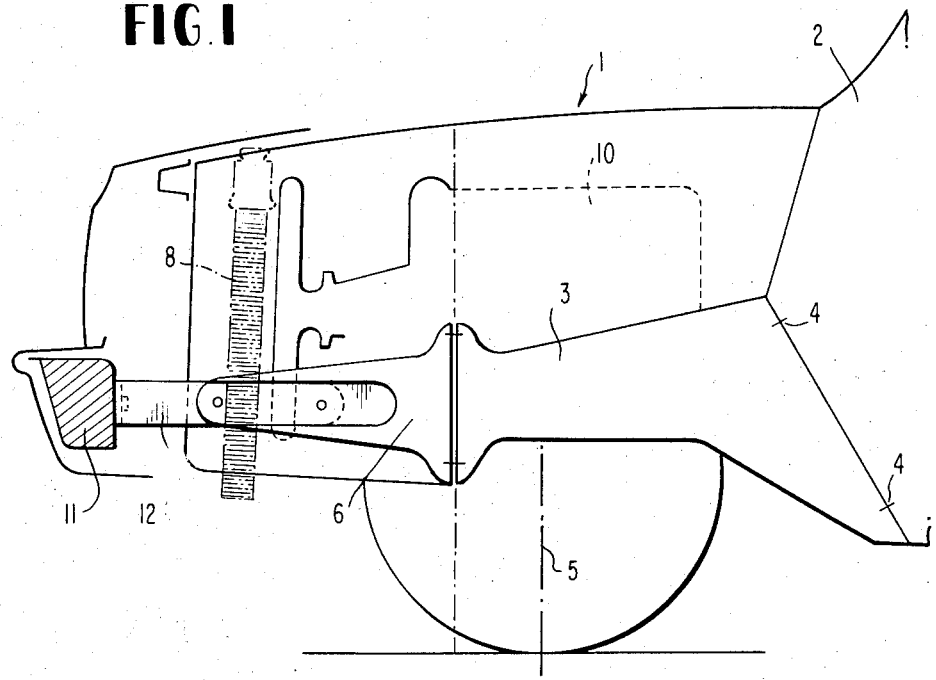
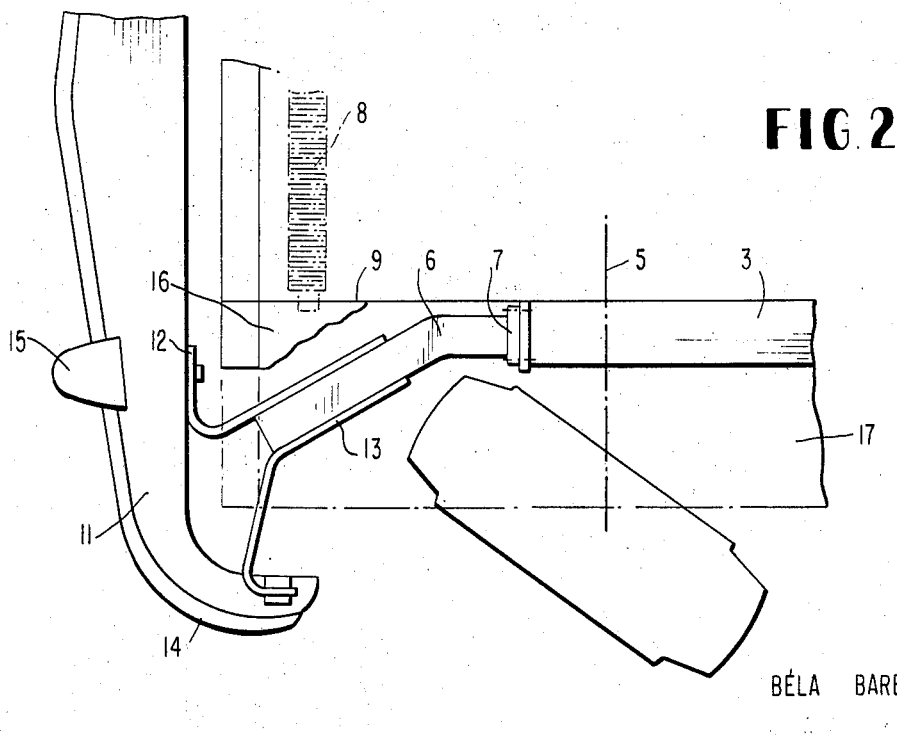

INVENTOR
BÉLA BARÉNYI

MOTOR VEHICLE FRONT END CONSTRUCTION

The present invention relates to a front end construction with a radiator for motor vehicles, especially passenger motor vehicles.

A passenger motor vehicle is described in the German Pat. No. 854,157 in which the frame and body are so dimensioned and constructed that the rigidity thereof is largest within the area of the passenger space and decreases continuously or step-wise toward the ends of the vehicle. This is achieved in that the vehicle is built up to several differently constructed sections whereby relatively easily deformable end sections adjoin the extremely stable center cell which accommodates the passengers. The end sections of lesser form-rigidity serve simultaneously for the mounting of the axle supports. In case of a front end collision, one obtains with such prior art construction the advantage that possibly only the end sections are damaged which not only can easily be exchanged but also protect the center cell against deformations, especially the center cell. However, it is disadvantageous that the end sections are arranged directly behind the bumper and in case of a deformation are not able to protect either the engine or the radiator against damages since the deformation path for absorbing the accident energy is too small and directly affects sensitive parts. A further disadvantage resides in that, for example, the front end section is constructed relatively narrow and, therefore, is hardly suited to protect the radiator or other parts of the engine.

It is known in connection with a further passenger motor vehicle (French Pat. No. 1,084,798) to arrange the radiator and engine between longitudinal girders which are supported at the longitudinal bearers and at a cross frame connected with the longitudinal bearers. With this construction the accident forces impinging on the bumper, which are directly absorbed by the longitudinal girders, directly affect, for example, the radiator rigidly supported between the same.

The present invention is concerned with the task to eliminate the disadvantages of the known front end constructions with radiators of motor vehicles and to provide a front end for a motor vehicle which can be readily exchanged after damages and offers an optimum protection against damages especially of the radiator.

The underlying problems are solved according to the present invention in that the longitudinal support girders adjoining the form-rigid vehicle passenger center cell of the motor vehicle are bifurcated or forked within the area of the axle planes and in that the radiator is arranged at bearers adjacent to or above the impact-yielding angular bends of the longitudinal girders so that a longitudinal yieldingness of the longitudinal girders exists and a damaging of the radiator and of the engine units can take place only after overcoming the penetration depth of the bumper. It is thereby advantageous if the longitudinal girders are divided at the angular bends within the area of the axle planes and the radiator is arranged between the connecting base of the longitudinal girders and the bumper of the motor vehicle. In order to be able to absorb particularly well the accident forces impinging on the motor vehicle, it is appropriate according to a further embodiment of the inventive subject matter that the outermost connecting portion of the longitudinal girders is constructed as elastically and/or plastically deformably effective deformation body. Small bumper impacts, which may be introduced into the body, for example, during the parking of the vehicle, are elastically absorbed by the front end construction so that no damaging of the vehicle occurs whereas medium collision impacts are considerably reduced in their energy in that the plastically deformably effective deformation bodies convert a part of this energy so that the remaining forces are no longer sufficient to damage the radiator and eventually also engine aggregates. It may additionally be appropriate that the outermost connecting parts are forked symmetrically or asymmetrically. This construction of the connecting parts will depend appropriately on the required space conditions. However, it is also possible, for example, that the bifurcation or forking takes place in the forward area of the motor vehicle toward the outside, i.e., away from the longitudinal axis of the vehicle and that the bifurcation or forking takes place in the rear area of the vehicle toward the longitudinal axis of the vehicle so that the radiator and engine can be accommodated protected between the bent longitudinal girders within the forward part whereas tanks and containers, for example, the compartment for the spare wheel, the fuel tank or the like which project out of the vehicle floor, are arranged adjacent the longitudinal girders in the rear part. A combinaton is also feasible within the scope of the present invention in which both connecting parts of the longitudinal girders are bent off in one direction, depending on how the space conditions and the absorption capability of impact forces to be provided require the same.

For simplifying the assembly it is advantageous if the support parts of the radiator form together with the fender apron a one-piece, structural element. The supporting parts of the radiator and the radiator preferably together with the connecting parts of the longitudinal girders may thereby be detachably connected at the longitudinal girders of the center cell within the area of the axle planes. Damaged deformation members can therefore be readily exchanged. According to a further advantageous construction of the subject matter of the present invention, the plastically deformably effective deformation members may be preferably constructed as closed impact pots and the elastically effective deformation members preferably as bent leaf-springs. It is thereby appropriate that the deformation members possess an increasing impact- and dent-rigidity in the vehicle longitudinal direction toward the center cell and beginning at the bumper. With the use of deformation members effective elastically and plastically deformable, it is advantageous if the elastically effective deformation members are arranged within the area of the bumper and the plastically deformably effective deformation member within the area of the axle planes. The guidance of the bumper is thereby improved and vibrations can be readily intercepted and prevented by reason of the short lever arms.

Accordingly, it is an object of the present invention to provide an end section construction for motor vehicles which avoids by simple means the aforementioned shortcomings and drawbacks encountered in the prior art.

Another object of the present invention resides in a front end construction for motor vehicles which effectively not only protects the center cell against deformation but also the radiator as well as engine parts.

A further object of the present invention resides in a front end construction for motor vehicles which not only offers effective protection of the radiator and engine but also permits ready exchange in case of damage after an accident.

Still another object of the present invention resides in a front end construction of a motor vehicle in which slight impacts, as occur, for example, during parking, can be readily absorbed while larger impact forces as occur during accidents are effectively dissipated to such an extent that the passengers in the center cell are effectively protected against the same.

These and other objects, features and advantages of the present invention will become more apparent from the following description when taken in connection with the accompanying drawings which shows, for purposes of illustration only, two embodiments in accordance with the present invention, and wherein FIG. 1 is a schematic side elevational view, partly in cross section, of a front end arrangement of a motor vehicle in accordance with the present invention;

FIG. 2 is a partial plan view of the front end arrangement according to FIG. 1;

Figure 3:
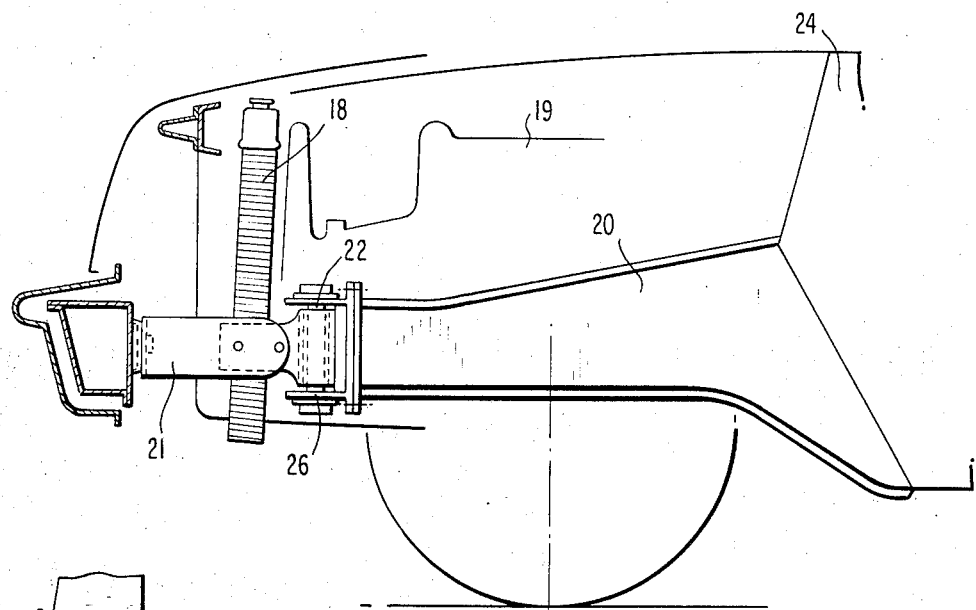
FIG. 3 is a schematic side elevational view, partially in cross section, through a modified embodiment of a front end arrangement of a motor vehicle in accordance with the present invention.

Referring now to the drawing wherein like reference numerals are used throughout the various views to designate like parts, FIG. 1 illustrates the front section of a motor vehicle generally designated by reference numeral 1 which is otherwise of conventional construction. The longitudinal support girders 3 which adjoin the form-rigid passenger center cell 2 of the motor vehicle, are connected either rigidly or detachably with the passenger cell 2 at the connecting places 4. The longitudinal girders 3 are constructed in this embodiment two-partite whereby the connecting part 6 is angularly bent toward the outside and is connected preferably readily detachably at the connecting base 7 within the area of the axle planes 5. The radiator 8 is secured to the longitudinal girders 3 at the wall 9 adjacent the connecting part 6. The radiator 8 and the engine 10, only schematically illustrated in FIG. 1, are therefore disposed in front of the passenger center cell 2 protected between the plastically deformable extension members 6 and the also plastically deformable longitudinal girders 3 which, however, have a greater form-rigidity.

The bumper 11 is connected with the plastically deformably effective deformation member 6 by way of bent leaf-springs 12 and 13 which in case of small impacts act as elastic deformation members and elastically yield so that the vehicle is not damaged. For that purpose the bumper 11 is also provided with a conventional rubber sheath 14 and bumper guards 15. As can be seen from FIG. 2, the supporting portions 16 of the radiator 8 form together with the fender apron 17 which is illustrated only in dash lines in FIG. 2, a one-piece unitary structural element which together with the connecting parts 6 of the longitudinal girders 3 are detachably connected to the longitudinal girders 3 of the passenger center cell 2 within the area of the axle planes 5. The plastically deformably effective deformation members 6 are constructed as closed impact bodies whereby it is particularly appropriate if the plastically deformably acting deformation members have a greater impact or dent rigidity than the elastically deformably acting deformation members 12, 13 so that the rigidity increases in the direction toward the passenger cell 2 and the deformation paths considerably decrease in case of a collision.

Figure 4:
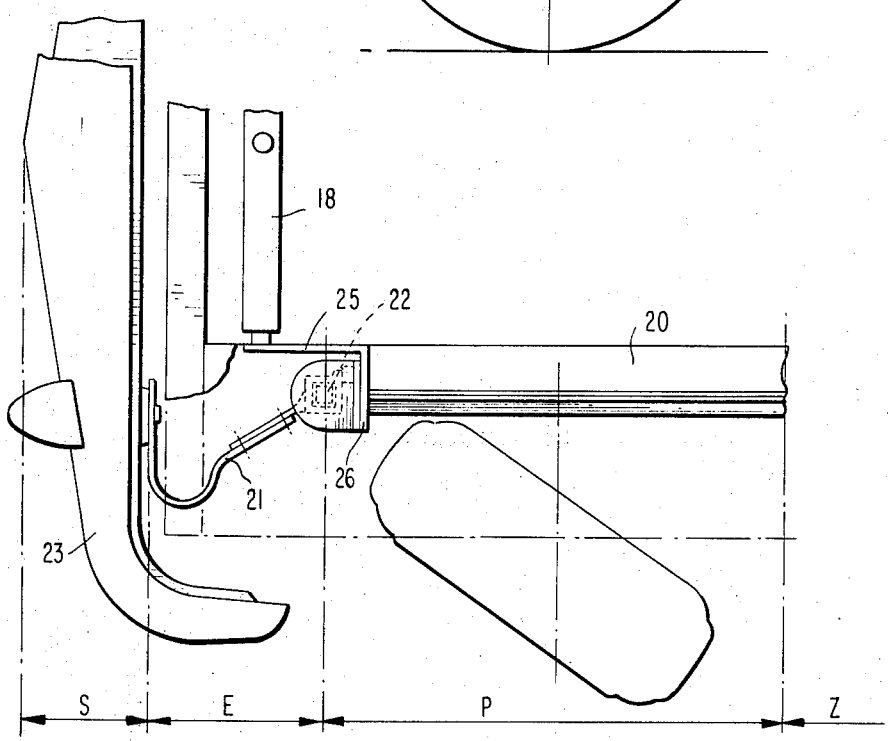
FIG. 4 is a partial plan view of the front end arrangement illustrated in FIG. 3.

Also in FIGS. 3 and 4 the radiator 18 and the engine 19 are arranged between the longitudinal support girders 20 and the angularly bent connecting parts 21 of the supporting longitudinal girders 20. Since in city traffic smaller impacts, for example, during parking, predominate larger accident forces acting on the vehicle, the construction of the elastically acting deformation member 21 is impoved by a torsion spring 22 which, by reason of its construction, is also able to absorb more readily impact forces acting obliquely on the bumper 23. The longitudinal girder 20 which serves in this case as plastically effective deformation member, is angularly bent in the vertical plane and connected either readily detachably or rigidly with the passenger cell 24. The radiator 18 may be connected directly at the longitudinal girder 20 by way of mountings or brackets 25, and more particularly together with the mounting flange 26 of the mounting of the bumper 23 consisting of the torsion spring 22 and of the bent leaf-spring 21.

To clarify how the front portion of a vehicle is subdivided in order to obtain effective protection in case of a crash, the entire front end of the vehicle is divided in FIG. 4 into four structural and accident-mechanical sections designated by the letters "S" denoting the section of the bumper; "E" denoting the elastic deformation zone; "P" denoting the plastic deformation zone; and "Z" denoting the region of the chassis.

While I have shown and described only two embodiments in accordance with the present invention, it is understood that the same is not limited thereto but is susceptible of numerous changes and modifications as are known to those skilled in the art. For example, an analogous construction may also be used for the rear end section of the vehicle. Consequently, I do not wish to be limited to the details shown and described herein but intend to cover all such changes and modifications as are encompassed by the scope of the appended claims.

What is claimed is:

1. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, for supporting the radiator between said connecting means at a predetermined distance behind the bumper and forwardly of said longitudinal girder means substantially in the area of said angular bends whereby a predetermined bumper penetration range is provided to protect the radiator in the event of an impact force on the bumper.

2. An end section arrangement according to claim 1, wherein said radiator support means is arranged adjacent said angular bends.

3. An end section arrangement according to claim 2, wherein said radiator support means is arranged above said angular bends.

4. An end section arrangement according to claim 1, wherein said radiator support means is arranged above said angular bends.

5. An end section arrangement according to claim 1 wherein said radiator support means are connected to said longitudinal girder means substantially in the area of said angular bends.

6. An end section arrangement according to claim 5 wherein said connecting means includes at least a first and second member, said first member having one end thereof connected to an end of said longitudinal girder means remote from the passenger cell, said second member having one end thereof connected to the other end of said first member and the other end thereof connected to the bumper.

7. An end section arrangement according to claim 6, wherein said second members are constructed as elastically deformably effective deformation members.

8. An end section arrangement according to claim 6, wherein said longitudinal girder means are constructed as plastically deformably effective deformation members.

9. An end section arrangement according to claim 6, wherein said frist and second members are constructed as deformation members.

10. An end section arrangement according to claim 1 wherein said connecting means includes at least a first and second member, said first member having one end thereof connected to an end of said longitudinal girder means remote from the passenger cell, said second member having one end thereof connected to the other end of said first member and the other end thereof connected to the bumper.

11. An end section arrangement according to claim 10, wherein said second member are constructed as elastically deformably effective deformation members.

12. An end section arrangement according to claim 10, wherein said first member are constructed as plastically deformably effective deformation members.

13. An end section arrangement according to claim 10, wherein said first members are constructed as deformation members.

14. An end section arrangement according to claim 1, wherein said radiator means includes a mounting bracket connected to said longitudinal girder means substantially in the area of said angular bends.

15. An end section arrangement with a bumper and radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means substantially in the area of said angular bends, for supporting the radiator between said connecting means substantially in the area of said angular bends; said connecting means includes at least a first and second member, said first member having one end thereof connected to an end of said longitudinal girder means remote from the passenger cell, said second member having one end thereof connected to the other end of said first member and the other end thereof connected to the bumper, said first and second members being constructed as plastically and elastically deformable deformation members respectively.

16. An end section arrangement according to claim 15, wherein said plastically deformably effective deformation members are constructed as impact pot and the elastically effective deformation members are constructed as leaf-springs.

17. An end section arrangement according to claim 16, wherein said impact pots are closed and said leaf springs are bent.

18. An end section arrangement according to claim 17, characterized in that with the use of elastically and plastically deformably effective deformation members the elastically effective deformation members are arranged within the area of the bumper and the plastically deformably effective deformation members are arranged substantially within the area of a vertical plane extending through an axle of the vehicle.

19. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means substantially in the area of said angular bends, for supporting the radiator between said connecting means substantially in the area of said angular bends; said connecting means includes at least a first member having one end thereof connected to an end of said longitudinal girder means remote from the passenger cell and a pair of second members connected to each of said first members and to the bumper said pair of second members being forked symmetrically.

20. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, substantially in the area of said angular bends, for supporting the radiator between said connecting means substantially in the area of said angular bends; said connecting means includes at least a first member having one end thereof connected to an end of said longitudinal girder means remote from the passenger cell and a pair of second members connected to each of said first members to the bumper, said pair of second members being forked asymmetrically.

21. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, for supporting the radiator between said connecting means substantially in the area of said angular bends, said radiator support means being constructed in one piece with a fender apron.

22. An end section arrangement according to claim 21, wherein said radiator support means and the radiator are readily detachable connected at the longitudinal girder means substantially within the area of a vertical plane extending through an axle of the vehicle.

23. An end section arrangement according to claim 21, wherein said radiator support means and the radiator together with the connecting means of the longitudinal girder means are readily detachably connected with the longitudinal girder means substantially within the area of a vertical plane extending through an axle of the vehicle.

24. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction from the longitudinal center plane of the vehicle; and means, extending in a forward direction of the vehicle and connected to said longitudinal girder means, for supporting the radiator between said connecting means, said connecting means includes at least a first member having one end thereof connected to an end of said longitudinal girder means remote from the passenger cell and a pair of second members connected to each of said first members and to the bumper said pair of second members being forked symmetrically.

25. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, for supporting the radiator between said connecting means substantially in the area of said angular bends said connecting means includes at least a first member having one end thereof connected to an end of said longitudinal girder means remote from the passenger cell and a pair of second members connected to each of said first members and to the bumper said pair of second members being forked asymmetrically.

26. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, for supporting the radiator between said connecting means substantially in the area of said angular bends; said connecting means includes at least a first and second member, said first member having one end thereof connected to an end of said longitudinal girder means remote from the passenger cell, said second member having one end thereof connected to the other end of said first member and the other end thereof connected to the bumper, and said radiator support means are constructed in one piece with a fender apron.

27. An end section arrangement according to claim 26, wherein said radiator support means and the radiator are readily detachably connected at the longitudinal girder means substantially within the area of a vertical plane extending through an axle of the vehicle.

28. An end section arrangement according to claim 26, wherein said radiator support means and the radiator together with connecting means of the longitudinal girder means are readily detachably connected with the longitudinal girder means substantially within the area of a vertical plane extending through an axle of the vehicle.

29. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, for supporting the radiator between said connecting means substantially in the area of said angular bends; said connecting means includes at least a first and second member, said first member having one end thereof connected to an end of said longitudinal girder means remote from the passenger cell, said second member having one end thereof connected to the other end of said first member and the other end thereof connected to the bumper, said first and second members being constructed as plastically and elastically deformable deformation members, respectively, said plastically deformably effective deformation members being constructed as impact pots and said elastically effective deformation members being constructed as leaf-springs.

30. An end section arrangement according to claim 29, wherein said impact pots are closed and said leaf springs are bent.

31. An end section arrangement according to claim 30, characterized in that with the use of elastically and plastically deformably effective deformation members the elastically effective deformation members are arranged within the area of the bumper and the plastically deformably effective deformation members are arranged substantially within the area of a vertical plane extending through an axle of the vehicle.

32. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, substantially in the area of said angular bends, for supporting the radiator between said connecting means substantially in the area of said angular bends; said connecting means includes at least a first member, said first member having one end thereof connected to an end of said longitudinal girder means remote from the passenger cell and a pair of second members connected to each of said first members and to the bumper.

33. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means substantially in the area of said angular bends, for supporting the radiator between said connecting means substantially in the area of said angular bends; said connecting means includes at least a first and second member, said first member comprising a torsion spring having one end thereof connected to an end of said longitudinal girder means remote from the passenger cell, said second member having end end thereof connected to the other end of said first member and the other end thereof connected to the bumper.

34. An end section arrangement with a bumper and a radiator for motor vehicles especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, for supporting the radiator between said connecting means substantially in the area of said angular bends; said connecting means includes at least a first member, said first member having one end thereof connected to an end of said longitudinal girder means remote from the passenger cell and a pair of second members connected to each of said first members and to the bumper.

35. An end section arrangement with a bumper and a radiator for motor vehicles, especially passenger vehicles having a form rigid passenger cell, comprising: longitudinal girder means, disposed on each side of the passenger cell, for supporting the bumper; means for connecting each of said longitudinal girder means to the bumper, each of said connecting means, substantially in the area of attachment to said girder means, forming an angular bend extending in a direction away from the longitudinal center plane of the vehicle; and means, extending in a forward direction of the vehicle and connected to said longitudinal girder means, for supporting the radiator between said connecting means substantially in the area of said angular bends; said connecting means includes at least a first and second member, said first member having one end thereof connected to an end of said longitudinal girder means remote from the passenger cell, said second member having one end thereof connected to the other end of said first member and the other end thereof connected to the bumper, said first and second members being constructed as plastically and elastically deformable deformation members, respectively.

* * * * *